United States Patent
Yang et al.

(10) Patent No.: US 9,967,081 B2
(45) Date of Patent: May 8, 2018

(54) SYSTEM AND METHOD FOR BEAMFORMING WTH AUTOMATIC AMPLITUDE AND PHASE ERROR CALIBRATION

(71) Applicant: HON HAI PRECISION INDUSTRY CO., LTD., New Taipei (TW)

(72) Inventors: Chau-Chin Yang, Los Angeles, CA (US); Ming-Je Yu, New Taipei (TW); Jian-De Wu, New Taipei (TW); Khiem Van Cai, Placenta, CA (US)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days. days.

(21) Appl. No.: 15/366,052

(22) Filed: Dec. 1, 2016

(65) Prior Publication Data
US 2017/0163327 A1 Jun. 8, 2017

Related U.S. Application Data

(60) Provisional application No. 62/262,930, filed on Dec. 4, 2015.

(51) Int. Cl.
*H04B 7/00* (2006.01)
*H04L 5/14* (2006.01)
(Continued)

(52) U.S. Cl.
CPC ............. *H04L 5/14* (2013.01); *H04B 7/0413* (2013.01); *H04B 7/086* (2013.01)

(58) Field of Classification Search
CPC ..... H04B 7/0617; H04B 7/063; H04L 5/0048; H04W 72/046
(Continued)

(56) References Cited

U.S. PATENT DOCUMENTS 5,634,199 A * 5/1997 Gerlach ............... H01Q 3/2605
455/103
6,658,234 B1 * 12/2003 Dogan ....................... G01S 3/74
342/373
(Continued)

FOREIGN PATENT DOCUMENTS

| EP | 1276251 A1 * | 1/2003 | ........... H04B 7/0845 |
| WO | WO 2006026890 A1 * | 3/2006 | ........... H04B 7/0408 |
| WO | WO 2013137794 A1 * | 9/2013 | ............. H04B 7/024 |

OTHER PUBLICATIONS

Van Veen et al., Beamforming—a versatile approach to spatial filtering, in IEEE ASSP Magazine, vol. 5, No. 2, pp. 4-24, Apr. 1988.*

(Continued)

*Primary Examiner* — Chieh M Fan
*Assistant Examiner* — Berhanu Tadese
(74) *Attorney, Agent, or Firm* — ScienBiziP, P.C.

(57) ABSTRACT

The present disclosure provides a method for performing beamforming. The method includes initiating a first signal transmitted from a target second device to be received by a first device having an antenna array. A first beamforming weight matrix is generated by the first device that automatically corrects amplitude and phase errors of the antenna array and maximizes antenna gain toward the target second device using a covariance matrix derived from the received first signal. An enhanced second beamforming weight matrix is then generated by the first device using a mask window or a jointly optimized algorithm to further suppress interference to and from other active second devices. The enhancement is computed and applied based on the distribution of multiple active second devices. The antenna array is steered using the second beamforming weight matrix to (Continued)

transmit to and receive from the target second device with an optimized antenna beam pattern.

16 Claims, 13 Drawing Sheets

(51) Int. Cl.
    *H04B 7/0413*     (2017.01)
    *H04B 7/08*     (2006.01)

(58) Field of Classification Search
    USPC .......................................... 375/260, 267, 395
    See application file for complete search history.

(56) References Cited

U.S. PATENT DOCUMENTS

| | | | | |
|---|---|---|---|---|
| 7,035,415 B2* | 4/2006 | Belt | ............... | H04M 9/082 379/406.01 |
| 7,561,632 B1* | 7/2009 | van Zelst | ............... | H04B 7/0434 375/267 |
| 8,259,005 B1* | 9/2012 | Lam | ............... | H01P 1/184 342/157 |
| 8,873,484 B1* | 10/2014 | Lee | ............... | H04B 7/0617 370/329 |
| 9,236,916 B2* | 1/2016 | Wernersson | ............... | H04B 7/024 |
| 9,559,417 B1* | 1/2017 | Schwarzwalder | ... | H04B 7/0456 |
| 2003/0073465 A1* | 4/2003 | Li | ............... | H01Q 3/26 455/562.1 |
| 2004/0198450 A1* | 10/2004 | Reilly | ............... | H04B 7/0822 455/562.1 |
| 2005/0265275 A1* | 12/2005 | Howard | ............... | H04B 7/0417 370/328 |
| 2006/0074320 A1* | 4/2006 | Yoo | ............... | A61B 8/08 600/472 |
| 2006/0279460 A1* | 12/2006 | Yun | ............... | H01Q 3/2605 342/377 |
| 2009/0116569 A1* | 5/2009 | Jin | ............... | H04B 7/0417 375/260 |
| 2009/0121936 A1* | 5/2009 | Maltsev | ............... | H01Q 3/2605 342/377 |
| 2009/0323847 A1* | 12/2009 | Na | ............... | H04B 7/0413 375/267 |
| 2010/0008406 A1* | 1/2010 | Sawai | ............... | H04L 25/03006 375/219 |
| 2010/0123625 A1* | 5/2010 | Martin | ............... | H01Q 1/246 342/377 |
| 2011/0170521 A1* | 7/2011 | Wang | ............... | H04B 7/0617 370/336 |
| 2011/0205913 A1* | 8/2011 | Van Zelst | ............... | H04B 7/043 370/252 |
| 2012/0093344 A1* | 4/2012 | Sun | ............... | H04R 3/005 381/122 |
| 2012/0182895 A1* | 7/2012 | Jwa | ............... | H04W 72/046 370/252 |
| 2012/0188889 A1* | 7/2012 | Sambhwani | ............... | H04B 7/0404 370/252 |
| 2012/0271144 A1* | 10/2012 | Kim | ............... | G01S 7/52047 600/407 |
| 2013/0170452 A1* | 7/2013 | Kwon | ............... | H04W 72/04 370/329 |
| 2013/0257655 A1* | 10/2013 | Hu | ............... | H04B 7/0408 342/373 |
| 2016/0301452 A1* | 10/2016 | Kwon | ............... | H04B 7/0421 |
| 2017/0117950 A1* | 4/2017 | Strong | ............... | H04B 7/0682 |

OTHER PUBLICATIONS

Abdolee et al., "Digital beam-forming implementation for downlink smart antenna system," 2009 52nd IEEE International Midwest Symposium on Circuits and Systems, Cancun, 2009, pp. 615-619.*

* cited by examiner

SYSTEM AND METHOD FOR BEAMFORMING WTH AUTOMATIC AMPLITUDE AND PHASE ERROR CALIBRATION

CROSS REFERENCE

This application claims the benefit of U.S. Provisional Application Ser. No. 62/262,930, filed on Dec. 4, 2015, and entitled "SYSTEM AND METHOD FOR BEAMFORMING WITH AUTOMATIC AMPLITUDE AND PHASE ERROR CALIBRATION", which is incorporated herein by reference in its entirety.

TECHNICAL FIELD

The subject matter herein generally relates to multiple-input multiple-output (MIMO) communication, in particular, to a system and a method for improving the beamforming performance using an antenna array.

BACKGROUND

Beamforming is a common communication technique used in wireless communication systems, in which an array of antennas is used to form respective beams to transmit or receive signals in such a manner that in directions of target devices, the antenna array creates constructive combining as the array directs towards other devices, and forms destructive cancellation. The beamforming device, such as a base station, mobile station, remote radio head (RRH) or any other transmitting and receiving device, can control the relative phase and amplitude of the signal from each transmitting/receiving antenna element to create a radiation pattern with the energy focused in a particular beam at a chosen direction to the targeted receiving device, rather than transmitting signals in all directions by using beamforming technique.

While a beamforming device using beamforming techniques performs signal transmission and reception in a multiuser communication system, radiation patterns typically include a mainlobe and one or more sidelobes. While the mainlobe is pointing toward the target device, the sidelobes are in general transmitted in all directions, causing interference with other active devices and lowering the overall efficiency in the communication system.

SUMMARY

Accordingly, the present disclosure provides a beamforming technique for efficiently and accurately determining beamforming weight for an antenna array (e.g. a digital antenna array) to improve the efficiency of the communication system and to increase the ability to service more user devices (e.g., mobile stations).

Disclosed are systems, methods and computer-readable media for providing a beamforming technique that enables accurate beamforming weight determination for an antenna array, and at the same time automatically calibrates amplitude and phase errors across antenna elements of the antenna array.

An exemplary embodiment of the present disclosure provides a method for performing communication between a first device and a plurality of second devices. The first device is generally considered stationary (e.g., a base station or a remote radio head) and communicates with a number of different second devices, which can be mobile user equipment, mobile stations, or the equivalent. The first device is equipped with an antenna array. Each of the second devices is equipped with at least one antenna. The first device and the second device are communicating in a Time Division Duplex (TDD) communication system, where an uplink and a downlink transmission are performed on the same frequency channel.

The method is illustrated as follows. The first device receives a signal transmitted from one of the second devices. Next, the first device computes a covariance matrix based on the received signal. The first device subsequently generates a first beamforming weight matrix associated with the antenna array using the covariance matrix computed. The first device further adjusts the first beamforming weight matrix to generate a second beamforming weight matrix corresponding to the second device using a mask window. The mask window can be configured based on the distance separation between the targeted second device and the adjacent second devices. Thereafter, the first device operatively steers the antenna array based on the second beamforming weight matrix to communicate with the targeted second device.

Another exemplary embodiment provides a beamforming control system for driving an array of antennas of a first device to generate a beamforming radiation pattern with respect to a second device in communication based on a signal received from the second device using the array of antennas. In the present embodiment, the second device can be a mobile device, which is operable to select an application at startup. The first device can be, for example, a base station, or a remote radio head (RRH).

The system at least includes a processor and a memory. The memory has stored instructions, which when executed by the processor, causes the processor to perform steps of, generating a first beamforming weight matrix based on a signal transmitted to the first device from one of the second devices communicating with the first device; applying a mask window adjusting the first beamforming weight matrix to generate a second beamforming matrix, wherein the mask window is configured based on the tradeoff between the beam-width of main lobe and the sidelobe rejection level; steering the antenna array using the second beamforming weight matrix to form a beam toward a direction of the second device.

In one embodiment, the first device generates the first beamforming weight matrix using a sub-space Singular Value Decomposition (SVD) algorithm from the covariance matrix computed.

In one embodiment, the first device generates the first beamforming weight matrix using a noise corrected cross correlation vector from the covariance matrix computed.

In at least one embodiment, the first device computes the second beamforming weight matrix corresponding to the targeted second devices by applying a Chebyshev window to uniformly suppress the sidelobe emissions to a desired level.

In another aspect, the present disclosure provides a beamforming device, and the beamforming device includes an antenna module, and a beamforming controller. The beamforming device is operated under a massive multiple-input and multiple-output (MIMO) system, particularly operated under a TDD MIMO data communication system.

The antenna module is configured to connect to the beamforming controller. The antenna array is configured to operatively form a radiation beam pattern to transmit and receive signal in a specific direction. The antenna module comprises an M by N antenna array. In one embodiment, the antenna module is an M by 1 antenna array, where M is an integer lying between 2 to 256.

The beamforming controller includes a phase and amplitude error calibration module, a mask window generator, and a beamforming control module. The mask window generator is coupled to the phase and amplitude error calibration module. The beamforming control module is coupled to the mask window generator.

The phase and amplitude error calibration module is configured to compute the covariance matrix based on a signal received from a mobile user equipment by each element of the antenna array, so as to generate the first beamforming weight matrix. The mask window generator is configured to generate a mask window based on the separation between the user equipment and adjacent user equipment, and apply the mask window to the first beamforming matrix to generate a second beamforming weight matrix. The beamforming control module is configured to control the radiation pattern generated by the antenna array for performing transmission and reception operation with the respective user equipment according to the second beamforming weight matrix.

In at least one embodiment, the beamforming device is configured to compute the second beamforming weight matrices after all the first beamforming weight matrices associated with all the second devices communicating with the beamforming device have been determined. The beamforming device operatively computes the second beamforming weight matrices for all the second devices based on all the first beamforming weight matrices in such a manner that the sidelobe emissions can be jointly and accurately suppressed in undesired directions toward other second devices while the main beam toward the targeted second device is maximized. As more second devices are able to share the same frequency band, the overall network efficiency is further optimized. In at least one embodiment, the beamforming device computes the second beamforming weight matrix using a zero-forcing (ZF) algorithm. In another embodiment, the beamforming device computes the second beamforming weight matrix using a maximum ratio combining (MRC) algorithm. In still another embodiment, the beamforming device computes the second beamforming weight matrix using a combination of the ZF algorithm and the MRC algorithm.

The following descriptions and appended drawings are referred to such that, all the purposes, features, and aspects of the present disclosure can be understood. However, the appended drawings are merely provided for reference and illustration, with no intention of limiting the scope of the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

Figure 1:
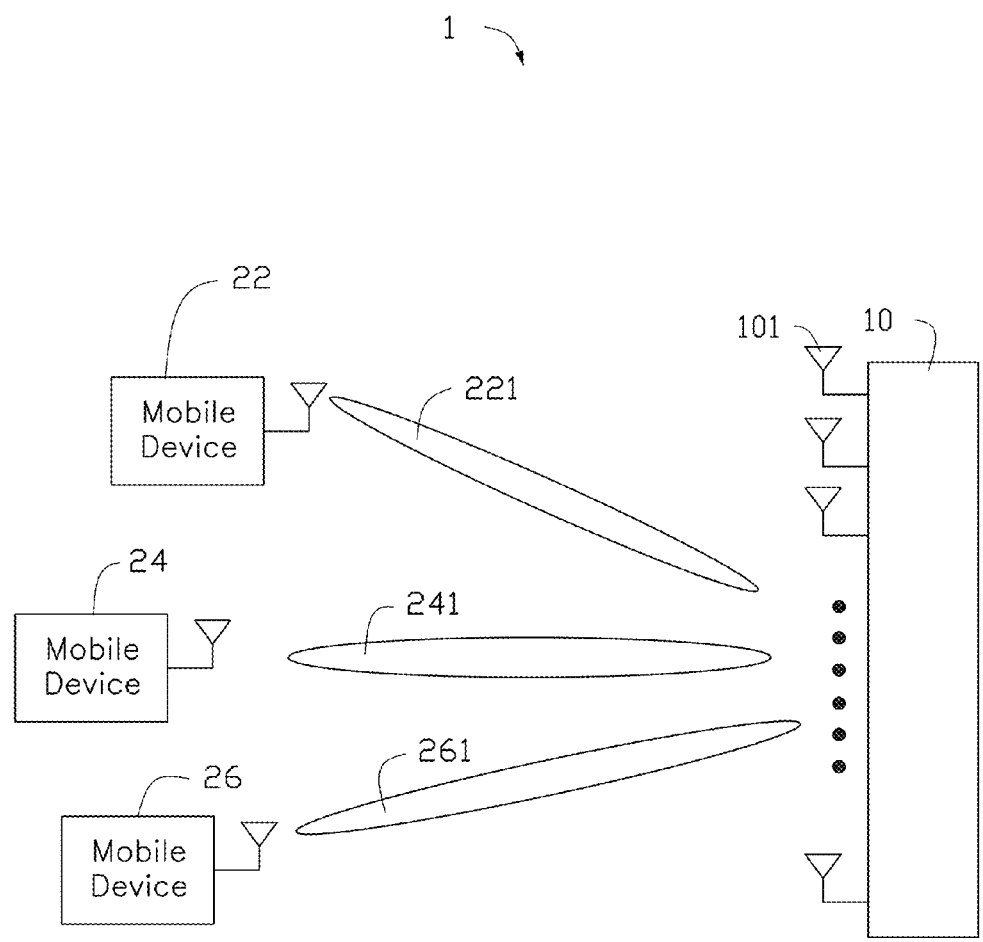
FIG. 1 is a diagram illustrating a communication system in accordance to an exemplary embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described.

The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series, and the equivalents. The term "coupled" is defined as connected, whether directly or indirectly through intervening components, and is not necessarily limited to physical connections.

Beamforming has been applied in various forms in standards such as 2G, 3G, Long Term Evolution (LTE) or 4G technologies. It is expected that beamforming will be part of more advanced standards such as the 5G standards.

In order to accurately compute beamforming weights to optimize the performance of an antenna array, it is required that the undesired amplitude and phase variations across each antenna array element be measured, tabulated, updated periodically while corrections are applied to compensate the undesired amplitude and phase variation in each beamforming weight computation. The present disclosure describes a methodology that can accurately compute beamforming weights from sub-space decomposition with amplitude and phase error corrections automatically included, thereby improving the efficiency of the communication system and increasing the ability to service more user devices (e.g., user equipment, mobile stations).

A system, method and computer-readable storage devices are disclosed for providing an improved beamforming approach applicable to the evolving 5G industry standard. Beamforming is anticipated to be used widely in 3rd Generation Partnership Project (3GPP) applications to enhance the network throughput performance, so as to increase the overall user experience.

A plurality of antennas will be needed to perform beamforming. As power and processing capability become available, sufficient number of antennas (e.g., 2-256 or more antennas) may deploy, to enable the creation of more focused beams with lower sidelobe level.

Embodiments disclosed herein include devices such as RRHs or base stations that include an array of antennas and communicate with a number of mobile devices. Other embodiments can include a mobile device or an equivalent device that is capable of communicating with another mobile device. Examples of mobile devices can be a smartphone, a laptop or a tablet. Yet other embodiments disclosed herein include methods practiced on a beamforming device (whether a device is stationary, such as a base station, or a mobile device, such as a smart phone) related to the implementation of beamforming operations.

FIG. 1 shows a diagram illustrating a massive multiple-input multiple-output (MIMO) communication system provided in accordance to an exemplary embodiment of the present disclosure. A massive MIMO communication system 1 includes a stationary station 10 (e.g., a base station, or a RRH) and mobile devices 22, 24, 26. The stationary station 10 is equipped with a plurality of antennas 101 arranged in an array form (e.g., M by N antenna array).

In the instant embodiment, the number of antennas associated with the stationary station 10 may be ranging from 2 to 256 antennas depending upon the application requirement. For example, a repeater, a base station, or a RRH may use 32-256 antennas. As the number of antennas increases, the ability of the system to transmit a focused beam of energy in a particular direction increases. Each of the mobile devices 22, 24, and 26 is equipped with at least one antenna. Similarly, depending on the application of the mobile device, the mobile devices 22, 24, and 26 may be equipped with one or more antennas. For instance, a handheld device, such as a smartphone, may have 1-8 antennas, while a vehicle may have 1-32 antennas. In the instant embodiment, the massive MIMO communication system 1 is a Time Division Duplex (TDD) data transmission system, i.e., the communications between the stationary device 10 and each of the mobile devices 22, 24, 26 are performed in the same frequency band.

Beams 221, 241, and 261 illustrate three beams of electromagnetic energy, in the same or different frequencies, formed by an antenna module of the stationary station 10 in a beamforming operation. Beams 221, 241, and 261 are focused in the respective directions of the mobile devices 22, 24, and 26. Data communication between each of the mobile devices 22, 24, 26 and the stationary station 10 may interfere with one another mobile devices depending upon the separation angle (e.g., the azimuth angle) between adjacent mobile devices if the same frequency is used for all mobile devices 22, 24, 26. For instance, the beam 241 formed to establish a data communication channel between the stationary station 10 and the mobile device 24 may be interfered by sidelobes associated with beams 221 and 261. The stationary station 10 is operable to accurately determine beamforming weights to form beams 221, 241, and 261 in respective directions while being able to suppress or mitigate the sidelobe emission effect to neighboring mobile devices, thereby improving the bandwidth efficiency and optimizing the network efficiency of the massive MIMO communication system 1, and more user devices can thus share the same frequency band.

The existence of sidelobes of energy is omitted from FIG. 1 for simplicity, which will typically have much lower power levels than the main beams and are to the left and/or right of any particular beam. It should be noted that sidelobes associated with each of the main beams are omitted from FIG. 1 for simplicity, where the sidelobes typically have much lower power levels than the main beams.

Figure 2:
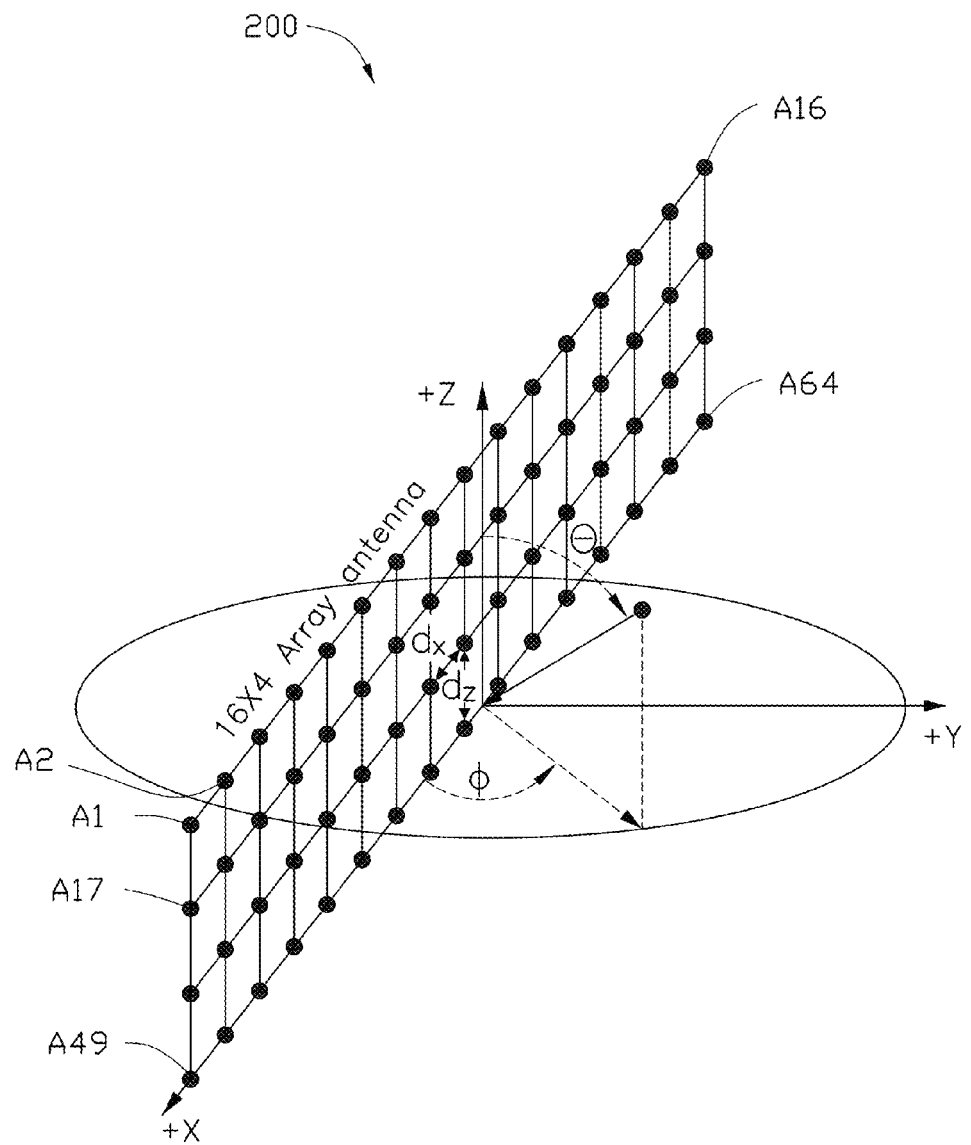
FIG. 2 is a diagram illustrating an arrangement for an antenna array used for a communication system in accordance to an exemplary embodiment of the present disclosure.

FIG. 2 is a perspective view illustrating an exemplary embodiment of an antenna array arrangement to be used by the stationary station 10 for performing beamforming operations. In the instant embodiment, an antenna array 200 for the antenna module is a 16 by 4 antenna array and includes 64 antenna elements A1 through A64. The bore-sight axis (i.e., the axis of maximum gain of the antenna array 200) is facing toward the positive Y-direction. The space between any two adjacent antenna elements along the X-direction is represented by $d_x$, and the space between any two adjacent antenna elements along the Z-direction is represented by $d_z$. An incident angle $\varphi$ associated with an incident signal is measured in the azimuth direction and represents the steering angle of the antenna array from the positive X-direction in the X-Y plane. An elevation angle $\theta$ is a tilt down angle between the incident signal and the positive Z-axis.

In practice, the antenna array for the stationary station 10 may be any M by N antenna array, such as a 64 by 1 antenna array, an 8 by 8 antenna array, or the like, depending on the operation requirements of the stationary station 10, and the present disclosure is not limited thereto.

Figure 3:
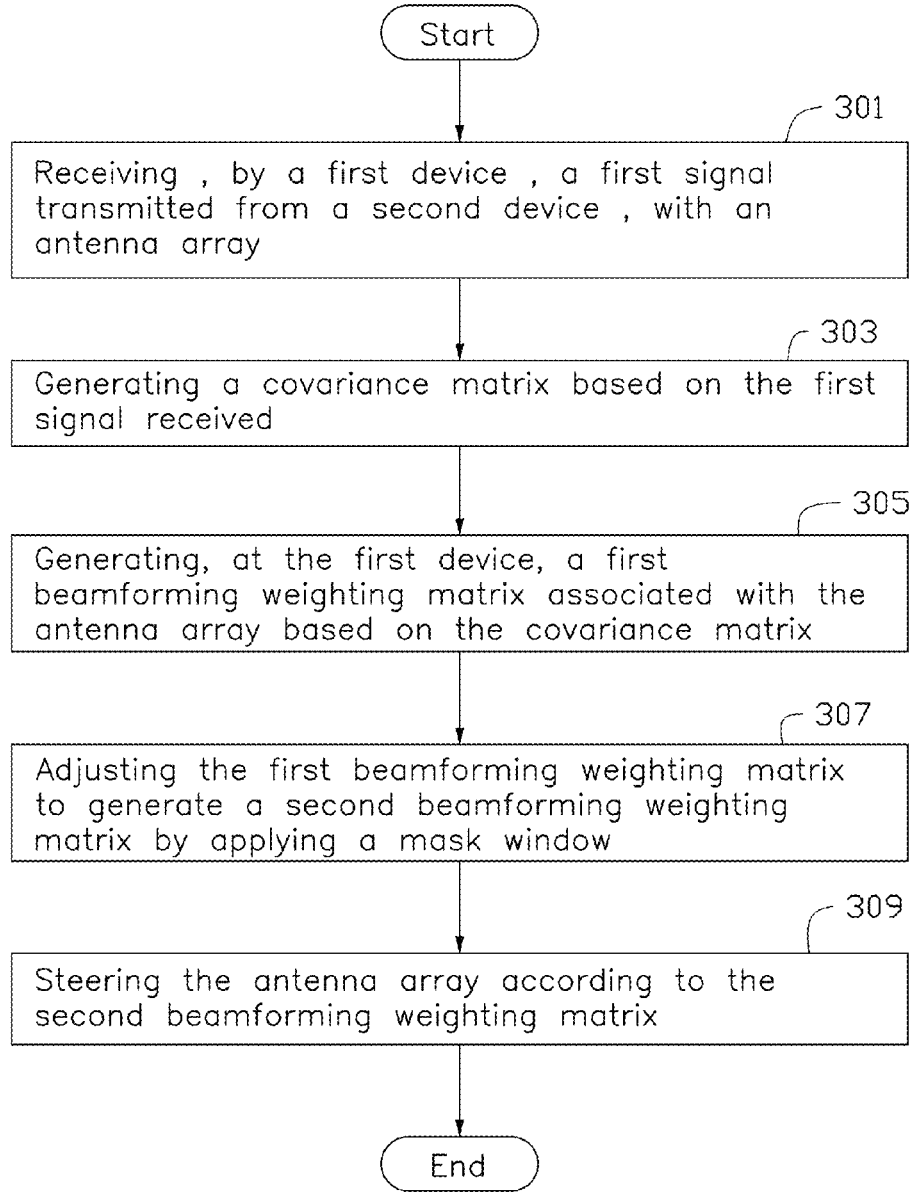
FIG. 3 is a flowchart diagram illustrating a beamforming method in accordance to an exemplary embodiment of the present disclosure.
Figure 4:
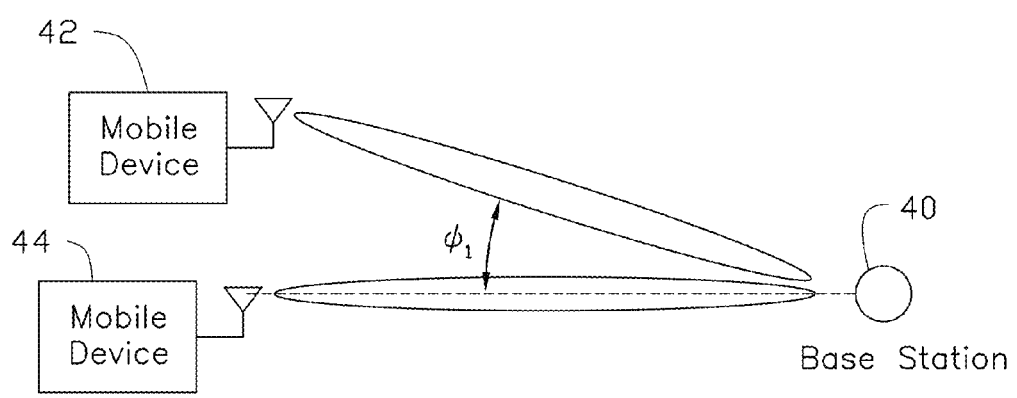
FIG. 4 is a diagram illustrating a communication system in accordance to another exemplary embodiment of the present disclosure.

Referring to FIG. 3 in conjunction to FIG. 4. FIG. 3 illustrates a beamforming method applicable to the massive MIMO communication system 1 of FIG. 1, which is a TDD-based communication system, provided in accordance to an exemplary embodiment of the present disclosure. FIG. 4 illustrates a beamforming operation. In the instant embodiment, the beamforming method illustrated is an application to the massive MIMO communication system, in which a first device communicates with one mobile station at a time.

One embodiment relating to the method depicted in FIG. 3 can be implemented by the first device such as a base station or a RRH, or any stationary station. The first device is generally considered the device that is stationary and communicates with a number of different second devices, which can be mobile stations or mobile user equipment or the like. The first device is equipped with an antenna array comprising a plurality of antenna elements, and the number of antenna elements can range between 2 and 256 antenna elements. In the instant embodiment, the antenna array is an M by 1 antenna array, for instance, a 64 by 1 antenna array.

M herein is an integer and in the instant embodiment represents the total number of antenna elements (e.g., 64) in the M by 1 antenna array.

At block 301, a first device (e.g., a base station 40) receives a first signal r(t) transmitted by a second device (e.g., a mobile station 44). The amplitude and phase errors associated with the antenna elements of the antenna array in response to the signal are unknown and these errors are shown with the received signal. The signal r(t) with unknown amplitude and phase errors may be represented by Eq. (1)

$$r(t) = \begin{bmatrix} r_0(t) \\ \vdots \\ r_k(t) \\ \vdots \\ r_{(M-1)}(t) \end{bmatrix} = \begin{bmatrix} A_0 e^{j\theta_0} s_0 \\ \vdots \\ A_k e^{j\theta_k} s_k \\ \vdots \\ A_{(M-1)} e^{j\theta_{(M-1)}} s_{M-1} \end{bmatrix} * x(t) + \begin{bmatrix} n_0(t) \\ \vdots \\ n_k(t) \\ \vdots \\ n_{(M-1)}(t) \end{bmatrix} \quad (1)$$

where $$s_k = e^{\frac{j2\pi k d \sin\phi}{\lambda}},$$

wherein r(t) represents the signal received by the first device; $n_k(t)$ represents the noise received by the kth antenna element; $A_0$ through $A_{(M-1)}$ represent the amplitude errors of the signal received by the antenna elements 0 to (M−1); $\theta_0$ through $\theta_{(M-1)}$ represent the phase errors the antenna elements 0 to (M−1); x(t) represents the signal actually transmitted by the second device (e.g., the mobile station 44); $s_k$ is the array steering vector toward the transmitting device, wherein k is an integer ranging between 0 to M−1; d is the separation distance between antenna elements, λ is a wavelength and □ is incident angle.

At block 303, the first device generates a covariance matrix R reflecting the channel characteristic between the first device (e.g., the base station 40) and the second device (e.g., the mobile station 44) based on the received signal r(t). In at least one embodiment, the signal r(t) may be an uplink signal from the second device (e.g., the mobile station 44) such as a reference signal, a pilot signal, or an actual data signal.

The first column (or a cross correlating vector $R_0$) of covariance matrix R, corresponds to the channel between the first device and the targeted second device (e.g., the mobile station 44), is computed by cross correlating the received signal $r_k$ at each of the M antennas with the signal $r_0$ received at the first antenna. The amplitude error $A_k$, the phase error $\theta_k$ and the steering vector $s_k$ can be jointly estimated from Eq. (1.1), using the cross correlations of signals received at different antenna elements.

$$R = [\, R_0 \; R_1 \; R_2 \; \ldots \; R_{(M-1)} \,] \quad (1.1)$$

$$R_0 = \begin{bmatrix} E[r_0 r_0'] \\ \vdots \\ E[r_k r_0'] \\ \vdots \\ E[r_{(M-1)} r_0'] \end{bmatrix} = A_0 E[xx'] \cdot \begin{bmatrix} A_0 e^{j(\theta_0-\theta_0)} s_0 s_0' + E[nn'] \\ \vdots \\ A_k e^{j(\theta_k-\theta_0)} s_k s_0' \\ \vdots \\ A_{(M-1)} e^{j(\theta_{(M-1)}-\theta_0)} s_{M-1} s_0' \end{bmatrix} =$$

$$Z \cdot \begin{bmatrix} A_0 e^{j\theta_0} s_0 + \sigma_n^2 \\ \vdots \\ A_k e^{j\theta_k} s_k \\ \vdots \\ A_{(M-1)} e^{j\theta_{(M-1)}} s_{M-1} \end{bmatrix}$$

where $Z = A_0 e^{-j\theta_0} s_0' E[xx']$;

$\sigma_n^2 = E[nn']$, wherein R represents the covariance matrix computed; $R_0$ represents the cross correlating vector associated with the first antenna element; $r_0(t)$ signal received by the first antenna element; $n_k(t)$ represents the noise received by the kth antenna element; $A_0$ through $A_{(M-1)}$ represent the amplitude errors of the signal received by the antenna elements 0 to (M−1); $\theta_0$ through $\theta_{(M-1)}$ represent the phase errors of the antenna element 0 to (M−1); $s_k$ is the array steering vector toward the transmitting device; $\sigma_n^2$ represents the noise covariance; k is an integer ranging between 0 to M−1; d is the separation distance between antenna elements.

At block 305, the first device (e.g., the base station 40) generates a first beamforming weight matrix $w_1$ associated with each of the antenna elements of the antenna array based on the covariance matrix R. The first beamforming weight matrix $w_1$ comprises of M by 1 beamforming weight coefficients, and each of the beamforming weight coefficients is associated with a corresponding one of the antenna elements.

In one embodiment, the first device (e.g., the base station 40) computes the first beamforming weight matrix $w_1$, which is generated based on the covariance matrix R using Singular Value Decomposition (SVD) algorithm. For example, the first beamforming weight matrix $w_1$ can be computed using Eq. (2) shown below, $$w_1 = \begin{bmatrix} w_0 \\ \vdots \\ w_k \\ \vdots \\ w_{M-1} \end{bmatrix} = \begin{bmatrix} \frac{g_0'}{|g_0|^2} \\ \vdots \\ \frac{g_k'}{|g_k|^2} \\ \vdots \\ \frac{g_{M-1}'}{|g_{M-1}|^2} \end{bmatrix} = \begin{bmatrix} \frac{1}{A_0} e^{-j\theta_0} s_0' \\ \vdots \\ \frac{1}{A_k} e^{-j\theta_k} s_k' \\ \vdots \\ \frac{1}{A_{(M-1)}} e^{-j\theta_{(M-1)}} s_{(M-1)}' \end{bmatrix}, \quad (2)$$

wherein $w_1$ represents the first beamforming weight matrix, and $w_0 \ldots w_{M-1}$ represent weight coefficient associated with each corresponding antenna element; $g=[g_0 \; g_1 \; \ldots \; g_{M-1}]^T$ represents the Eigen vector associated with the largest Eigen value;

$$s_k = e^{\frac{j2\pi k d \sin\phi}{\lambda}}$$

represents the steering factor of the array antenna toward the incident signal.

Alternatively, the first device can generate the first beamforming weight matrix $w_1$ associated with each antenna elements of the antenna array using Eq. (1.1) with the first column (or the cross-correlation vector $R_0$) of covariance matrix R having noise variance estimation subtracted from the first entry (e.g., the covariance coefficient $E[r_0 r_0']$), wherein the noise variance is estimated based on the signal r(t) received from the targeted second device (e.g., mobile station 44). In other words, instead of having performing the computation intensive SVD algorithm and obtaining the Eigen vector associated with the largest Eigen value, the vector g for Eq. (2) can be computed and generated by correcting the noise variance in the cross correlation vector $R_0$, which is a single column of the covariance matrix, as depicted in Eq. (2.1)

$$g = R_0 - \begin{bmatrix} Z\sigma_n^2 \\ 0 \\ \vdots \\ \vdots \\ 0 \end{bmatrix} \quad (2.1)$$

wherein g represents a cross correlation vector $R_0$ having noise variance substrate; $Z\sigma_n^2$ represents the noise variance estimated for the received signal r(t). The first beamforming weight matrix $w_1$ is then generated using Eq. (2) in the similar way as the vector g is generate by the SVD algorithm.

Moreover, at block 305, by computing the first beamforming weight matrix $w_1$ using either the SVD algorithm or using Eq. (2.1) for beamforming operation, the unknown amplitude and phase errors associated with the antenna elements in response to the signal received r(t) can be compensated at the same time without calibration. That is, the received signal after beam-forming is a coherent combination of the transmitted signal x(t) from the second device received at all the antenna elements with different amplitudes and phases, it can be computed using Eq. (3), wherein M represents the number of antenna elements in the antenna array.

$$w_1^T r(t) = \begin{bmatrix} \frac{1}{A_0} e^{-j\theta_0} s_0' \\ \vdots \\ \frac{1}{A_k} e^{-j\theta_k} s_k' \\ \vdots \\ \frac{1}{A_{(M-1)}} e^{-j\theta_{(M-1)}} s'_{(M-1)} \end{bmatrix}^T \begin{bmatrix} A_0 e^{j\theta_0} s_0 \\ \vdots \\ A_k e^{j\theta_k} s_k \\ \vdots \\ A_{(M-1)} e^{j\theta_{(M-1)}} s_{M-1} \end{bmatrix} * x(t) = Mx(t) \quad (3)$$

At block 307, the first device (e.g., the base station 40) adjusts the first beamforming weight matrix $w_1$ by applying an adjustable mask window based on the channel condition and the mobile station distribution, so as to generate a second beamforming weight matrix $w_2$. The second beamforming weight matrix can be described using Eq. (4), $$w_2 = \begin{bmatrix} C_0 w_0 \\ \vdots \\ C_k w_k \\ \vdots \\ C_{M-1} w_{M-1} \end{bmatrix} = \begin{bmatrix} \frac{C_0}{A_0} e^{-j\theta_0} s_0' \\ \vdots \\ \frac{C_k}{A_k} e^{-j\theta_k} s_k' \\ \vdots \\ \frac{C_{M-1}}{A_{(M-1)}} e^{-j\theta_{(M-1)}} s'_{(M-1)} \end{bmatrix}, \quad (4)$$

wherein $w_2$ represents the second beamforming weight matrix; $C=[C_0 \; C_1 \; \ldots \; C_{M-1}]$ represents the mask window with length M.

In the instant embodiment, the mask window is configured according to the Signal to Interference plus Noise Ratio (SINR) requirement and separation between adjacent mobile stations to minimize the interference from sidelobe emissions of adjacent mobile stations. For instance, the mobile station 44 in FIG. 4 is located along the boresight axis direction (e.g., at an azimuth angle of 0) with respect to the antenna array of the base station 40. The mobile station 42 is located an azimuth angle of at ψ1 from the boresight axis. The base station 40 of FIG. 4 (i.e., the first device) can generate the second beamforming matrix $w_2$ corresponding to the position of the mobile station 44 (i.e., the targeted second device) by applying the mask window based on the separation (e.g., azimuth angle) between the mobile station 42 and the mobile station 44 with respect to the base station 40. The mask window can be configured based on the tradeoff between the beam width of the main beam and the sidelobe rejection level.

In one embodiment, the mask window can be implemented by a Chebyshev window for minimizing or suppressing the sidelobe interferences, wherein the Chebyshev window is configured based on the channel condition and the mobile station distribution.

In one embodiment, the mask window can be implemented by a finite impulse response (FIR) filter.

Figure 5A:
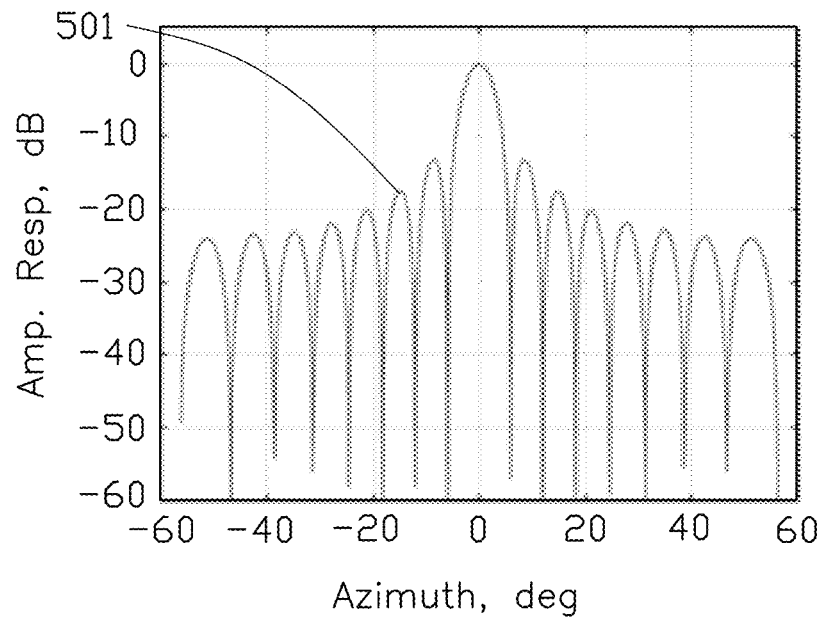
FIG. 5A and FIG. 5B are diagrams each illustrating a beamforming radiation pattern for one mobile user equipment in accordance to an exemplary embodiment of the present disclosure.
Figure 5B:
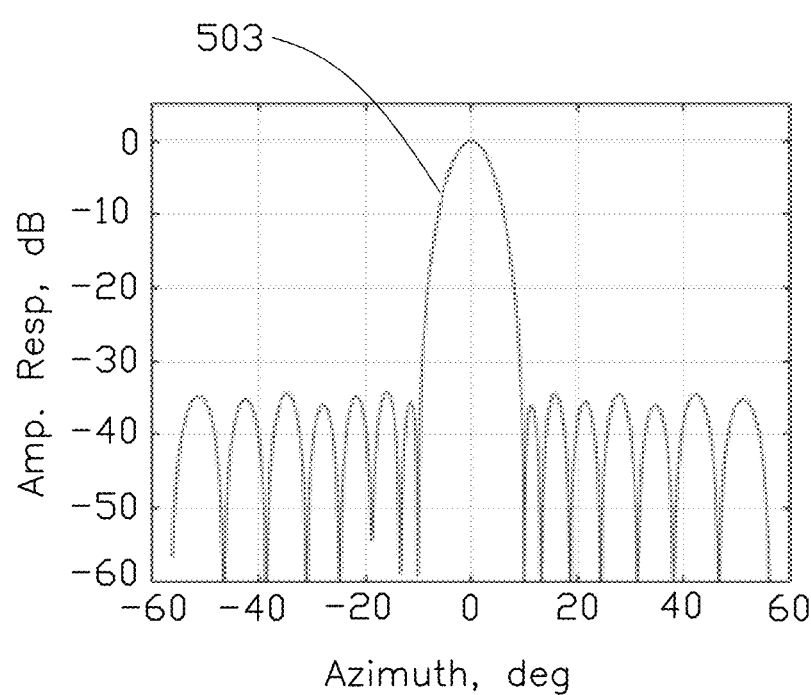

FIG. 5A illustrates a beamforming radiation pattern 501 representing a beam formed by the antenna array of the first device in the direction of the targeted mobile station (e.g., the mobile station 44 of FIG. 4), wherein the antenna array is steered using the first beamforming weight matrix, i.e., without applying the mask window. FIG. 5B illustrates a beamforming radiation pattern 503 representing a beam formed by the antenna array of the first device in the direction of the targeted mobile station (e.g., the mobile station 44 of FIG. 4), wherein the antenna array is steered using the second beamforming weight matrix with sidelobe being suppressed to a desired level (e.g., −35 dB with respect to the main beam). In the meantime, as the result of trade-off, it is observed that the main beam width is thus widen using the second beamforming weight matrix as compared to the width of the main beam in the radiation pattern 501.

At block 309, the antenna array of the first device is steered according to the second beamforming weight matrix to form a specific beamforming pattern toward the specific direction of the targeted second device (e.g., the mobile station 44) for performing data transmission and reception operations.

Under the signal transmission operation, the first device can pre-code the signal to be transmitted to the targeted second device (e.g., the mobile station 44) using the second beamforming weight matrix and steer the antenna array to transmit the pre-coded signal to the targeted second device. Under the signal reception operation, the first device steers the antenna array to form a reception beam pattern toward the targeted second device to receive the signal transmitted by the targeted second device.

In the instant embodiment, the first device is a base station and the second device is a mobile device. In another example, the first device is a mobile device and the second device is a base station. In still another example, both the first device and the second device can be mobile devices.

It is expressly stated that the application of the various steps and functions depicted in FIG. 3 are interchangeable between embodiments and that any order of the steps is possible.

Figure 6:
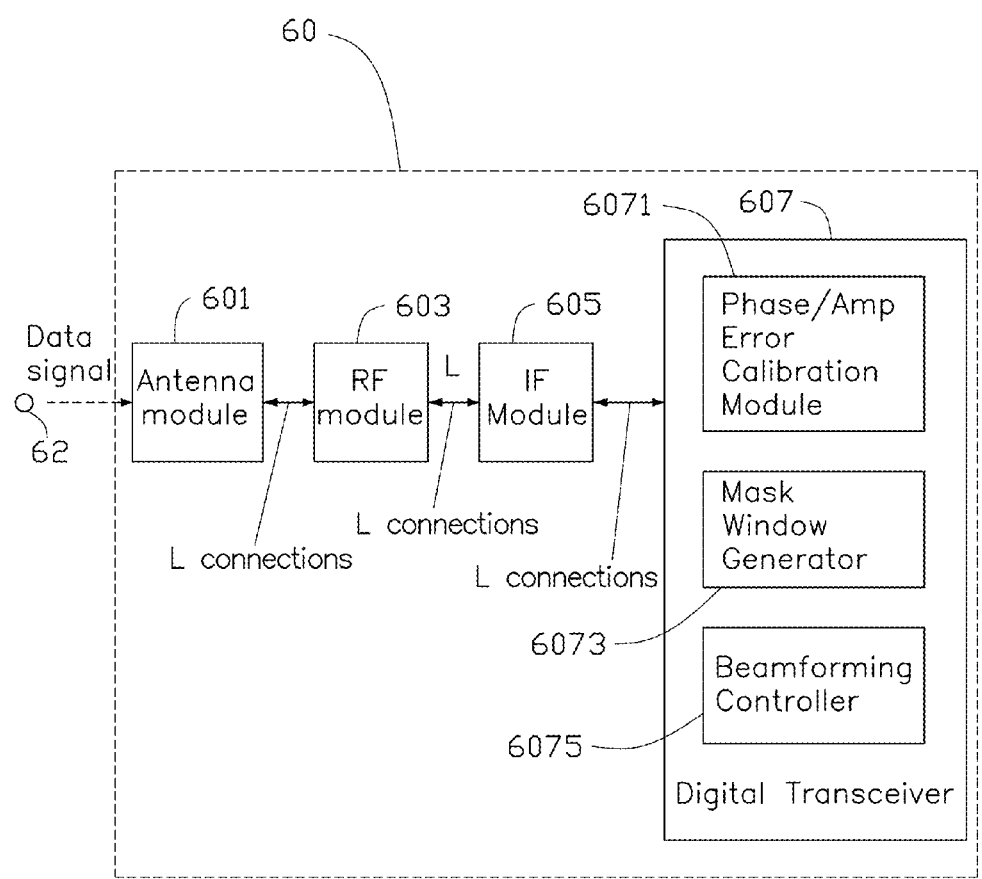
FIG. 6 is a block diagram illustrating a base station architecture in accordance to an exemplary embodiment of the present disclosure.

FIG. 6 illustrates a beamforming control system applicable to a massive MIMO communication system provided by an exemplary embodiment of the present disclosure. In the instant embodiment, a first device 60 is configured to communicate with a second device 62, which can be a mobile station, mobile user equipment, or the like. The first device 60 is a stationary station, such as a base station or a RRH.

The first device 60 includes an antenna module 601, a radio frequency (RF) module 603, an intermediate frequency (IF) module 605, and a beamforming controller 607. These components are cascaded via mechanical and/or electrical connections. In the instant embodiment, the antenna module 601 is coupled to the RF module 603 via cable connection (e.g., L connections). The RF module 603 is coupled to the IF module 605 via cable connection. The IF module 605 is coupled to the digital transceiver 607.

The antenna module 601 is configured to generate at least one directional beam to perform signal transmission and reception operations with the second device 62. The antenna module 601 comprises an antenna array, and the antenna array comprises of a plurality of antenna elements. The number of antenna elements in the antenna array depends upon application, and can range from 2 to 256 antennas. In one embodiment, the antenna module 601 comprises an antenna array formed by 64 antenna elements. The number of cable connections (e.g., L connections) deployed between the antenna module 601 and the RF module 603, the RF module 603 and the IF module 605, and the IF module 605 and the digital transceiver 607 depends upon the number of antenna elements in the antenna module 601. In at least one embodiment, some of the cable connections are implemented by optical fibers.

The RF module 603, which may include software, hardware, or a combination of both, is configured to up-convert signals sent from the IF module 605 to RF module 603 and transmit RF signals through the antenna module 601, or to receive RF signals from the antenna module 601, down-convert the signals and output the signal to the IF module 605. The IF module 605, which may include software, hardware, or a combination of both, is configured to sample the IF signals received from the RF module 603 with a built-in A/D converter and outputs the digitized data streams to the digital transceiver 607 or to convert digital streams received from the digital transceiver 607 using a D/A converter and outputs converted IF signals to the RF module 603.

The digital transceiver 607, which may include software, hardware, or a combination of both, is configured to determine the optimal beamforming weight associated with the antenna array for a targeted mobile station and to steer the antenna array of the antenna module 601 to generate beamforming pattern. The digital transceiver 607 further comprises a phase and amplitude error calibration module 6071, a mask window generator 6073, and a beamforming controller 6075. The phase and amplitude error calibration module 6071 is coupled to the mask window generator 6073. The mask window generator 6073 is coupled to the beamforming controller 6075.

The phase and amplitude error calibration module 6071 is configured to compute the covariance matrix based on the signal received at all antenna elements from the second device 62, so as to generate a first beamforming weight matrix corresponding to the direction of the second device 62.

In one embodiment, the phase and amplitude error calibration module 6071 computes the first beamforming weight matrix based on the covariance matrix using the Singular Value Decomposition (SVD) algorithm.

In one embodiment, the phase and amplitude error calibration module 6071 computes the first beamforming weight matrix using the covariance matrix with noise variance corrected from its first correlating vector.

The mask window generator 6073 is configured to adjust the first beamforming weight matrix by applying a mask window to generate a second beamforming weight matrix, wherein the mask window generator 6073 generates the mask window based on the separation between adjacent second devices in the communication system. In the instant embodiment, the mask window generator 6073 is configured to apply an amplitude taper across the antenna array to reduce sidelobe levels of the second device, thus suppress sidelobe interference to and from other second devices. In at least one embodiment, the mask window generator 6073 implements the mask window by generating a Chebyshev window for minimizing or suppressing the sidelobe interferences. In one embodiment, mask window generator 6073 implements the mask window by generating a finite impulse response (FIR) filter.

The beamforming controller 6075 is configured to steer the antenna array and control the beamforming pattern generated to perform transmission and reception operations with the second device.

The digital transceiver 607 in other embodiments can further include other modules for performing operations including but not limited to signal demodulation and decoding operations, and baseband signal processing on the received signal after applying beamforming weights (e.g., the second beamforming weight matrix).

It is noteworthy that the system embodiment disclosed herein includes basic hardware components associated with base stations, RRHs, transmission devices, etc. The basic components can include processors, whether virtual, generic or specialized processors for performing certain tasks, memory (e.g., cache, RAM, short-term memory, or long-term memory such as a hard drive or optical disk), input and output devices (e.g., keyboards, touch-sensitive pads, speech sensors, motion sensors, and/or display units), a communication bus for connecting components together and for communication of data. Any known programming language can be used to program devices to perform any functionality disclosed herein and different languages will be known to those of skill in the art. In a general system embodiment, a processor and a computer-readable storage medium or device are included. The medium stores instructions, which when executed by the processor cause the processor to perform certain steps that are disclosed herein. Software modules can also include code, which when executed by a processor cause the processor to perform certain operations.

Figure 7:
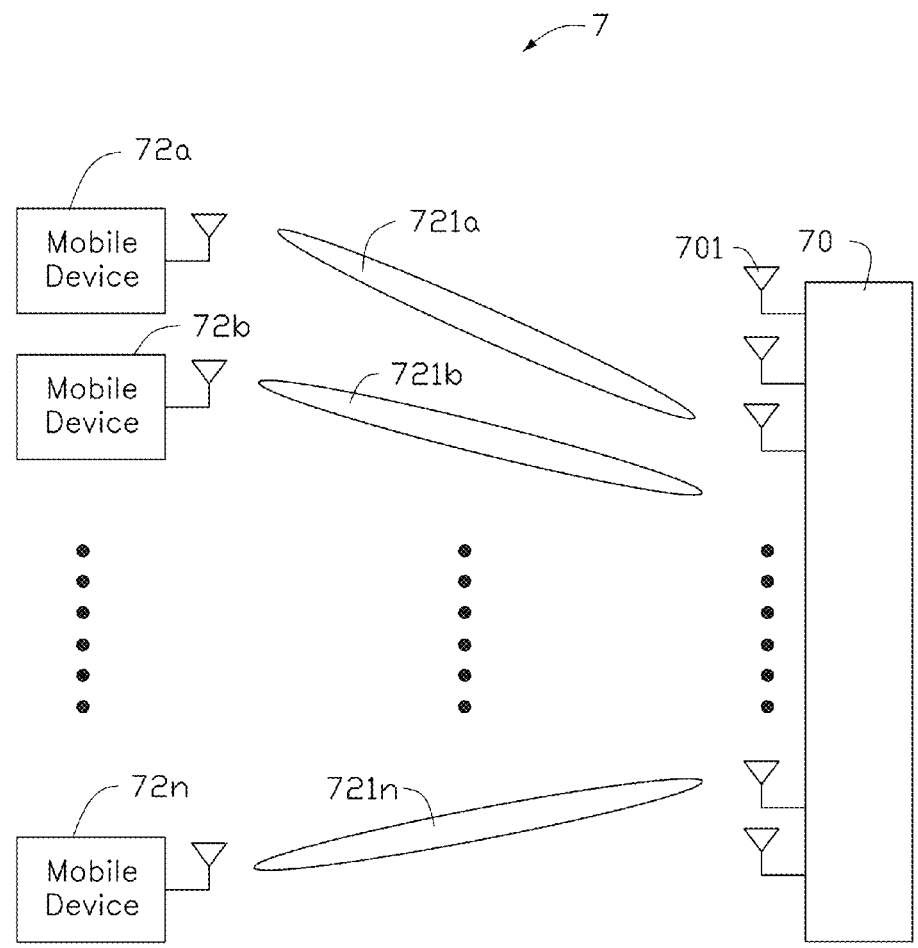
FIG. 7 is a diagram illustrating a communication system in accordance to another exemplary embodiment of the present disclosure.

FIG. 7 illustrates a massive MIMO communication system architecture provided in accordance to another exemplary embodiment. A massive MIMO communication system 7 includes a first device 70, a plurality of second devices 72a through 72n. The massive MIMO communication system 7 is a TDD-based data communication system, wherein the uplink and downlink transmissions are performed in the same frequency band. The first device 70 is equipped with an antenna array comprising plurality of antennas 701 arranged in an array format (e.g., M by N antenna array). The first device 70 is operable to communicate with the second device 72a through 72n by performing beamforming operations. The number of second devices may range from 2 to 24 units.

In one embodiment, the first device 70 is a base station and the second device is a mobile station. In one embodiment, the first device is a RRH and the second device is a mobile user equipment. In one embodiment, the first device is a mobile station and the second device is a base station. In one embodiment, the first device is a mobile user equipment and the second device is a RRH. In still another embodiment, the first device I a mobile station and the second device is another mobile station. The second devices 72a through 72n may each be handheld devices, or a vehicle.

Beams 721a through 721n illustrate n beams of electromagnetic energy formed by the antenna module of the first device 70 in a beamforming operation and are focused in the respective directions of the second devices 72a through 72n, respectively. Data communication between each of the second devices 72a through 72n and the first device 70 may be interfered by the neighboring second devices depending upon the separation between adjacent second devices.

The first device 70 is operable to accurately determine beamforming weights to form beams 721a through 721n in respective directions of the second device, while able to suppress or mitigate the sidelobe effect to neighboring second devices. As a result, multiple user devices can share the same frequency band and the bandwidth efficiency thus can be maximized using the massive MIMO communication system 7.

Figure 8:
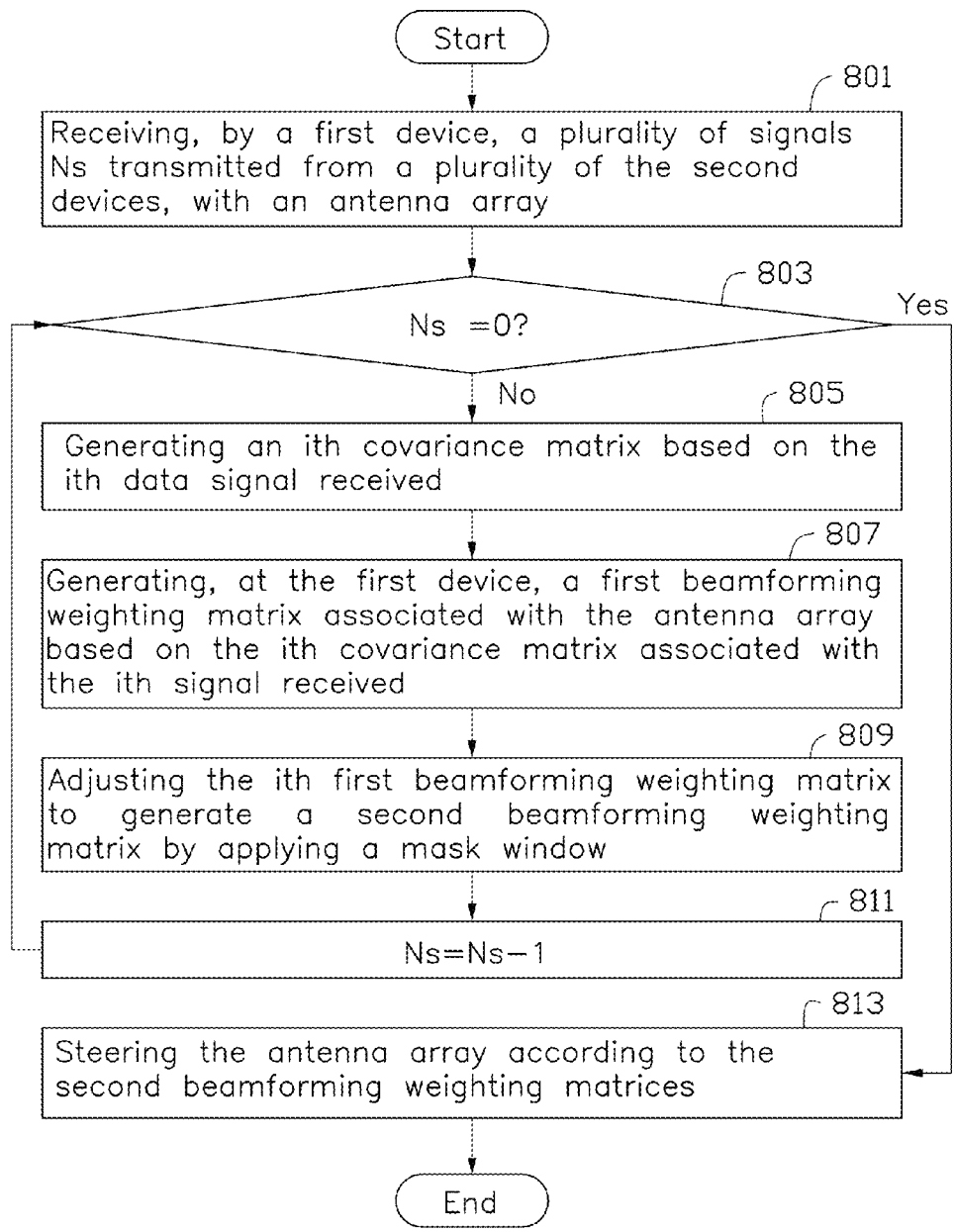
FIG. 8 is a flowchart diagram illustrating a beamforming method in accordance to another exemplary embodiment of the present disclosure.

Referring to FIG. 8 in conjunction with FIG. 7, FIG. 8 illustrates a method for beamforming process, which is applicable to a TDD-based MIMO communication system such as the massive MIMO communication system 7 of FIG. 7.

The first device 70 communicates with the second devices 72a through 72n and performs data communication one second device at a time. At block 801, the first device 70 operatively receives an $i^{th}$ signal $r_i(t)$ transmitted from one of the second devices 72a through 72n, using the antenna array, wherein i is an integer and represents the number of the second devices in the massive MIMO communication system. At block 803, the first device 70 determines whether signals from all the second devices 72a through 72n in the massive MIMO communication system have been received. In the instant embodiment, the first device 70 determines whether the number of signals Ns to be received is zero. When the first device 70 determines that the number of signals to be received is not zero, this indicates that the first device 70 has not yet finish receiving signals from all the second devices 72a through 72n, the first device executes block 805. When the first device 70 determines that the number of signals to be received is zero, block 813 is executed.

At block 805, the first device 70 generates an $i^{th}$ covariance matrix $R_i$ based on the $i^{th}$ signal $r_i(t)$ received, which corresponds to the $i^{th}$ second device. At block 807, the first device 70 generates the $i^{th}$ first beamforming weight matrix $w_{i,1}$ associated with each antenna elements of the antenna array based on the $i^{th}$ covariance matrix $R_i$. In one embodiment, the first device (e.g., the base station 40) computes the first beamforming weight matrix $w_{i,1}$ based on the $i^{th}$ covariance matrix $R_i$ using either a singular value decomposition (SVD) algorithm or computing from a cross correlation vector in the corresponding covariance matrix $R_i$ having noise variance corrected. At block 809, the first device 70 adjusts the $i^{th}$ first beamforming weight matrix $w_{i,1}$ to generate an $i^{th}$ second beamforming weight matrix $w_{i,2}$ corresponding to the targeted second device by applying a mask window. The first device 70 configures the mask window based on the channel condition and the separation between the adjacent second devices. In one embodiment, the first device 70 implements the mask window with a Chebyshev window. At block 811, the first device 70 decreases the number of signals Ns by 1 and returns to block 803. At block 813, the first device 70 steers the antenna array to generate the beamforming pattern directed to each of the respective second devices to perform data communication according to the respective second beamforming weight matrix $w_{i,2}$.

For instance, there are two second devices 72a and 72b communicating with the first device 70, and the number of signals to be received Ns is 2. The first device 70 computes the first and the second beamforming weight matrices associated with each of the second devices 72a and 72b separately. In the instant embodiment, the first device 70 receives the first signal from the respective second device 72a, computes the first and second beamforming weight matrices $w_{1,1}$, $w_{1,2}$ in response to the first signal received from the second device 72a. The first device 70 decreases the Ns by 1, resulting in Ns=1. Next, the first device 70 receives the second signal from the respective second device 72b, computes the first and second beamforming weight matrices $w_{2,1}$, $w_{2,2}$ in response to the received second signal. After the first device 70 finishes computing and obtaining the first and second beamforming weight matrices associated with the antenna array, the first device 70 steers the antenna array to generate beamforming patterns accordingly.

Figure 9A:
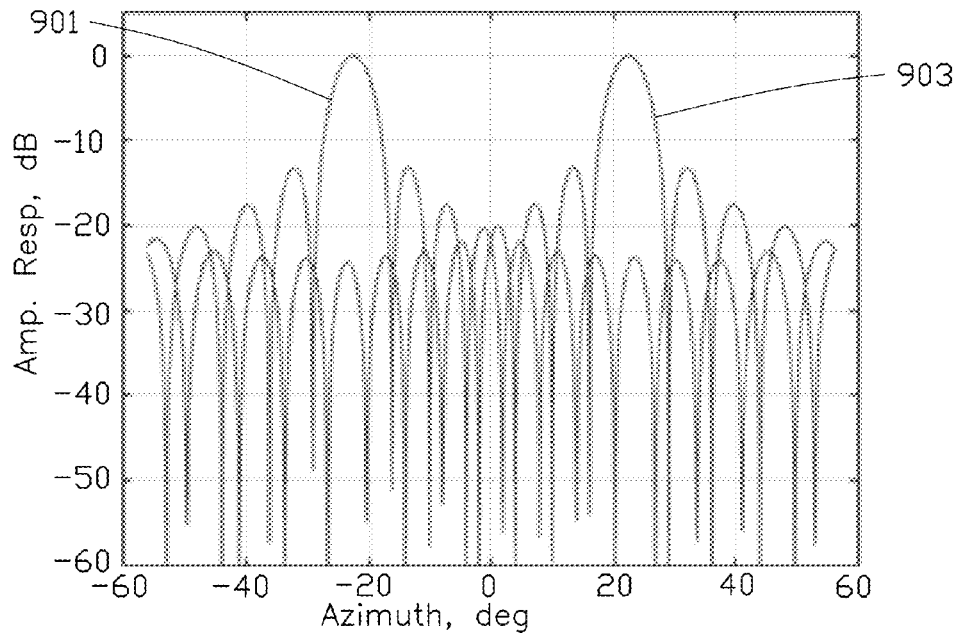
FIG. 9A and FIG. 9B are diagrams each illustrating beamforming radiation patterns for two mobile user equipment in accordance to another exemplary embodiment of the present disclosure.
Figure 9B:
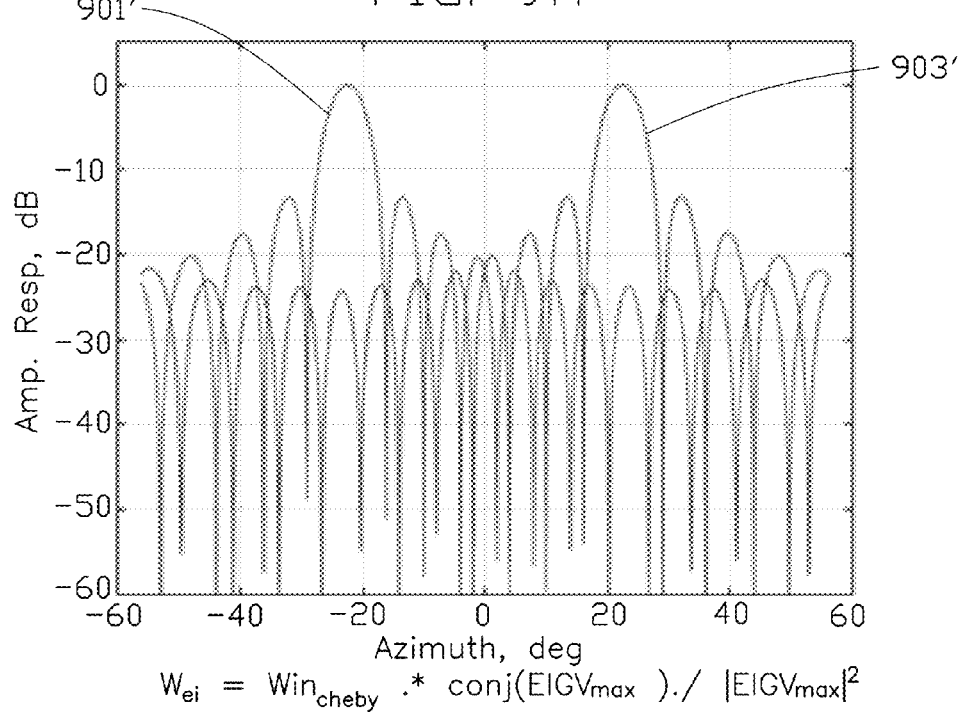

FIG. 9A illustrates beamforming radiation patterns 901, 903 representing beams formed by the antenna array of the first device in the direction of the second device (e.g., the mobile stations), wherein the antenna array is steered using the first beamforming weight matrices $w_{1,1}$, $w_{2,1}$. The first mobile station is located at an azimuth angle of −22 degrees with respect to the bore-sight axis of the antenna array. The second mobile station is located at an azimuth angle of 22 degrees with respect to the bore-sight axis of the antenna array. FIG. 9B illustrates beamforming radiation patterns 901' and 903' represent beams formed by the antenna array of the first device in the direction of the targeted mobile stations. The antenna array is steered to generate beams with sidelobes being suppressed to a desired level (e.g., −35 dB) using the second beamforming weight matrix $w_{1,2}$, $w_{2,2}$.

Figure 10A:
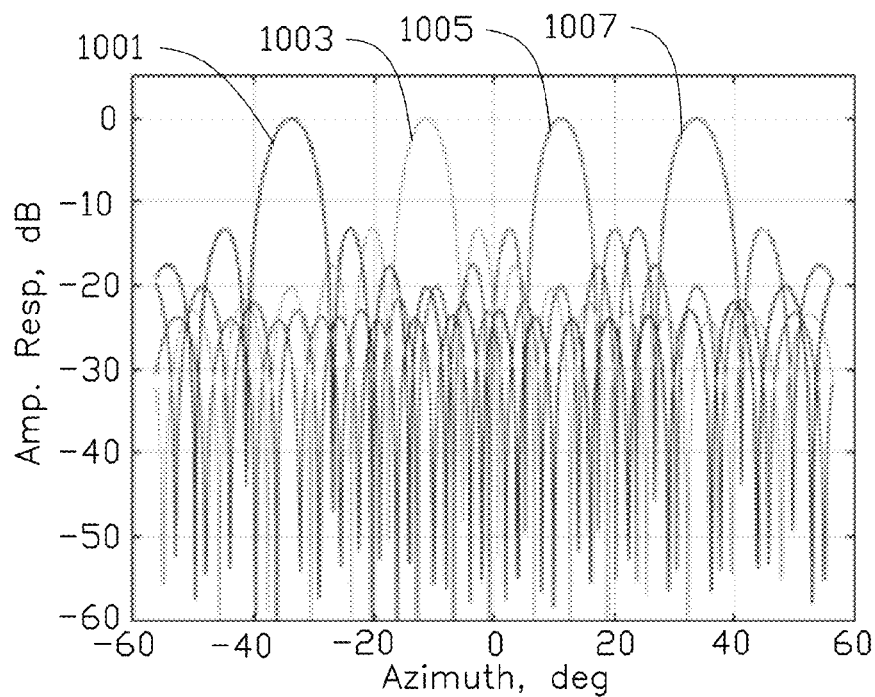
FIG. 10A and FIG. 10B are diagrams each illustrating beamforming patterns for four mobile user equipment in accordance to another exemplary embodiment of the present disclosure.
Figure 10B:
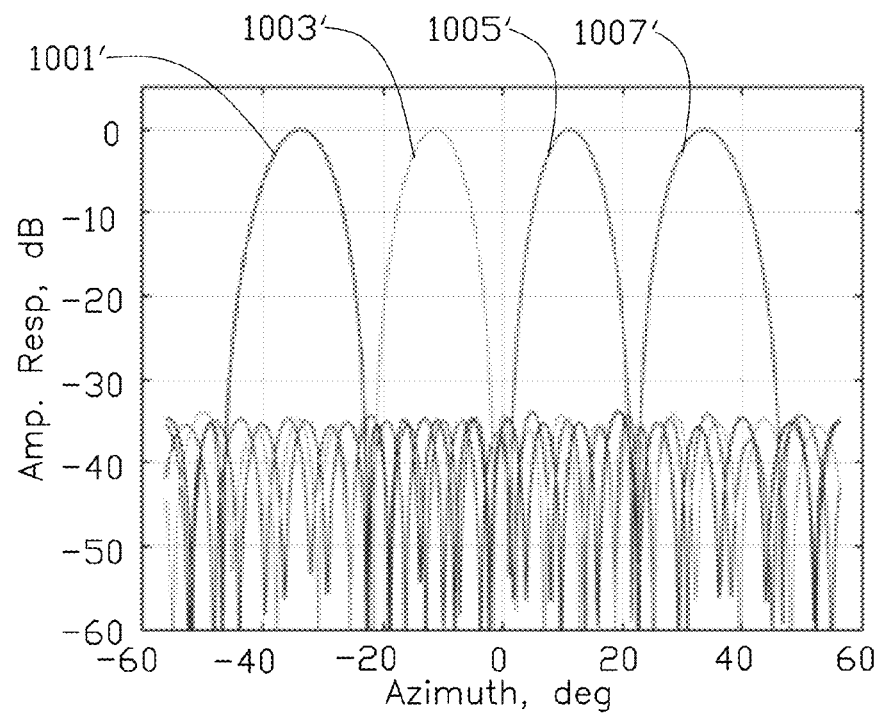

FIG. 10A illustrates beamforming radiation patterns 1001, 1003, 1005, and 1007 representing beams formed by the antenna array of the first device 70 in the direction of four second devices, wherein the antenna array is steered using the first beamforming weight matrices $w_{1,1}$, $w_{2,1}$, $w_{3,1}$, $w_{4,1}$ without sidelobe suppression. The first mobile station is located at an azimuth angle of −35 degrees with respect to the boresight axis of the antenna array. The second mobile station is located at an azimuth angle of −15 degrees with respect to the boresight axis of the antenna array. The third mobile station is located at an azimuth angle of 15 degrees with respect to the boresight axis of the antenna array. The fourth mobile station is located at an azimuth angle of 35 degrees with respect to the boresight axis of the antenna array. FIG. 10B illustrates beamforming radiation patterns 1001', 1003', 1005', 1007' representing beams formed by the antenna array of the first device 70 in the direction of the targeted mobile stations. The antenna array is steered to generate beams with sidelobes being suppressed to a desired level (e.g., −35 dB) using the second beamforming weight matrices $w_{1,2}$, $w_{2,2}$, $w_{3,2}$, $w_{4,2}$, respectively.

Figure 11:
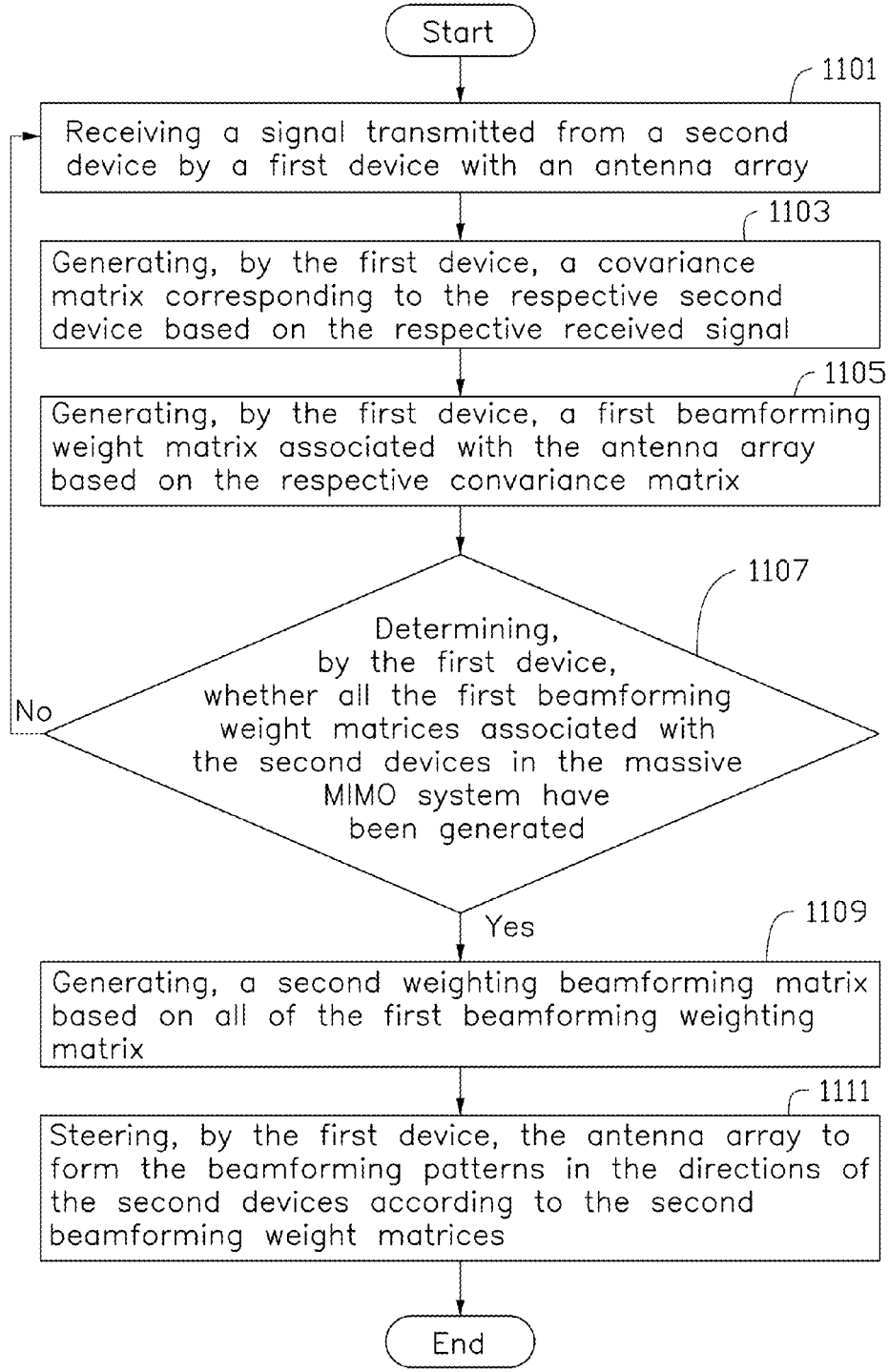
FIG. 11 is a flowchart diagram illustrating a beamforming method in accordance to another exemplary embodiment of the present disclosure.

FIG. 11 illustrates another method of beamforming process provided in accordance to another exemplary embodiment. The method of beamforming process is applicable to a TDD-based data communication system, such as the massive MIMO system 7 depicted in FIG. 7. FIG. 7 herein merely serves for illustration purpose, and the scope of the instant embodiment is not limited to the system architecture depicted FIG. 7.

Initially, the first device 70 communicates with the second devices 72a through 72n and performs data communication with one second device (mobile station) at a time to compute the corresponding first beamforming matrices for each of the second device (mobile stations 72a through 72n). After all the first beamforming matrices $\{w_{i,1}\}$ are computed, the first device 70 is configured to enhance the performance of the antenna array by jointly optimizing the second beamforming matrices $\{w_{i,2}\}$ for all the mobile stations 72a through 72n in the massive MIMO system 7 based on the channel conditions between the respective mobile stations 72a through 72n and the first device 70.

At block 1101, the first device 70 with an antenna array receives a signal $r_i(t)$ transmitted from one of the second devices (mobile stations 72a through 72n). At block 1103, the first device 70 generates a covariance matrix corresponding to the respective second device (e.g., one of the mobile stations 72a through 72n) based on the respective received signal $r_i(t)$. At block 1105, the first device 70 generates a first beamforming weight matrix $w_{i,1}$ associated with the antenna array based on the respective covariance matrix generated. At block 1107, the first device 70 determines whether all the first beamforming weight matrices $\{w_{i,1}\}$ associated with the second devices (mobile stations 72a through 72n) in the massive MIMO system 7 have been generated. When the first device 70 determines that not all of the first beamforming weight matrices $\{w_{i,1}\}$ associated with the second devices (mobile stations 72a through 72n) have been generated, the first device 70 returns to block 1101 to determine the first beamforming weight matrix for the next second device; otherwise block 1109 is executed. At block 1109, the first device 70 determines that all of the first beamforming weight matrices $\{w_{i,1}\}$ associated with the second devices (mobile stations 72a through 72n) have been generated, then the first device 70 generates a second beamforming weight matrices $\{w_{i,2}\}$ for all the second devices 72a through 72n based on all of the first beamforming weight matrices $\{w_{i,1}\}$ computed earlier, so as to maximize antenna gain toward target second devices (targeted mobile stations) while jointly and effectively cancel the undesired sidelobe interferences toward other second devices. In one embodiment, the first device 70 may determine the second beamforming weight matrices $\{w_{i,2}\}$ by applying a zero-forcing (ZF) operation to the first beamforming weight matrices $\{w_{i,1}\}$. In another embodiment, the first device 70 may determine the second beamforming weight matrix $w_2$ by applying the Maximum Ratio Combining (MRC) operation to the first beamforming weight matrices $\{w_{i,1}\}$.

At block 1111, the first device 70 steers the antenna array to form the beamforming patterns in the directions of the second devices (mobile stations 72a through 72n) according to the second beamforming weight matrices $\{w_{i,2}\}$ to perform the data communication operations with the second devices (mobile stations 72a through 72n), thereby optimizing the overall efficiency of the massive MIMO system 7.

Figure 12A:
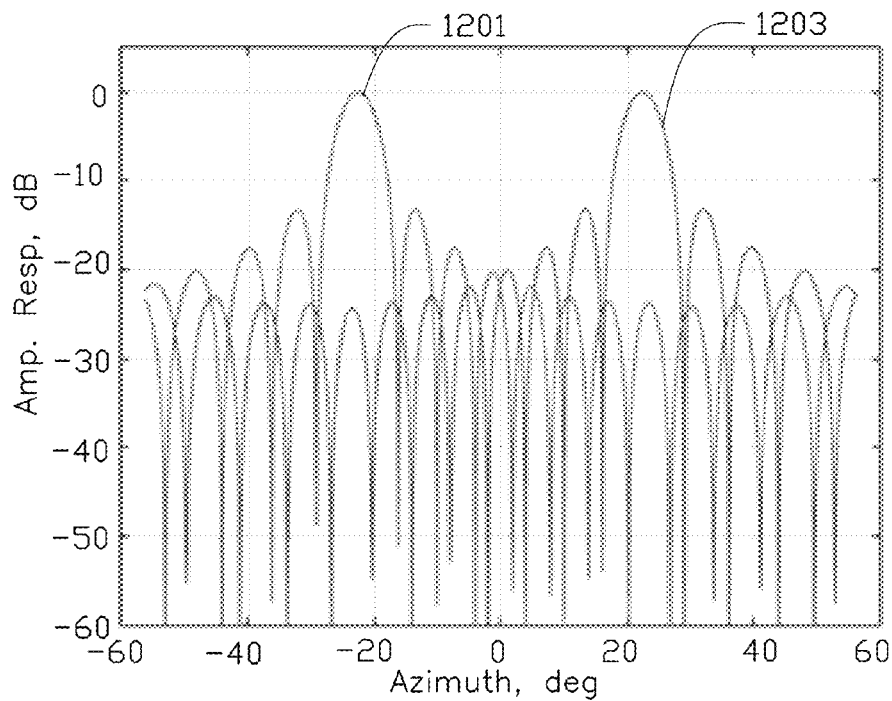
FIG. 12A and FIG. 12B are diagrams each illustrating beamforming patterns for two mobile user equipment using zero-forcing algorithm in accordance to another exemplary embodiment of the present disclosure.

FIG. 12A illustrates beamforming radiation patterns 1201 and 1203 representing beams formed by the antenna array of the first device 70 in the direction of the targeted second device (e.g., the mobile stations), wherein the antenna array is steered using the first beamforming weight matrices $w_{1,1}$, $w_{2,1}$, respectively. The first mobile station is located at an azimuth angle of −22 degrees with respect to the bore-sight axis of the antenna array. The second mobile station is located at an azimuth angle of 22 degrees with respect to the bore-sight axis of the antenna array.

Figure 12B:
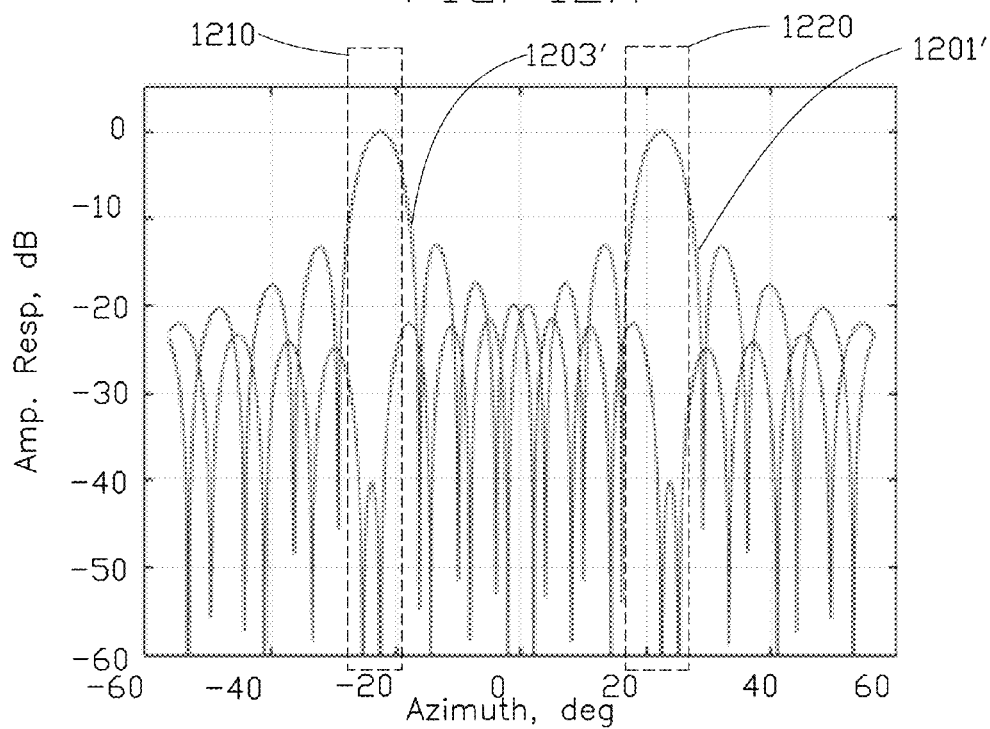

FIG. 12B illustrates beamforming radiation patterns 1201' and 1203' representing beams formed by the antenna array of the first device in the direction of the targeted mobile stations. The antenna array of the first device is steered to generate beams with a null toward the direction of the adjacent second device; the null suppressed interference to a rather deep level (e.g., at least −60 dB) using the second beamforming weight matrices $w_{1,2}$, $w_{2,2}$, which are generated using the zero-forcing algorithm. The beamforming radiation pattern 1201', generated by the antenna array of the first device, has a peak gain at azimuth angle of 22 degree and a null at the azimuth angle of −22 degrees (depicted by box 1210), while the beamforming radiation patterns 1203' generated by the antenna array of the first device has a peak gain at azimuth angle of −22 degree and a null at the azimuth angle of 22 degrees (depicted by box 1220).

Figure 13A:
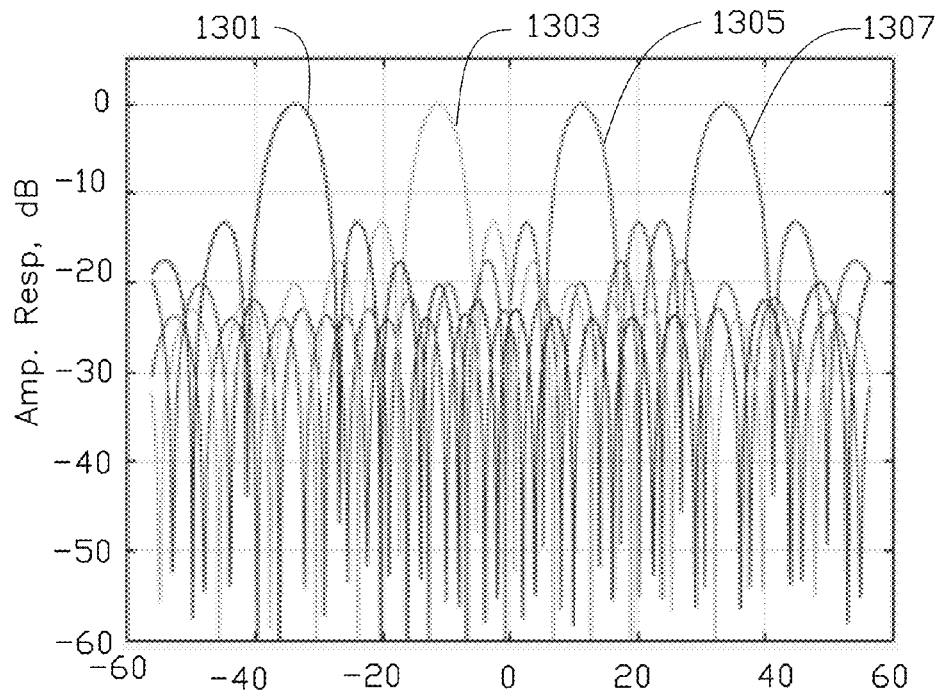
FIG. 13A and FIG. 13B are diagrams each illustrating beamforming patterns for four mobile user equipment using zero-forcing algorithm in accordance to another exemplary embodiment of the present disclosure.

FIG. 13A illustrates beamforming radiation patterns 1301, 1303, 1305, and 1307 representing beams formed by the antenna array of the first device 70 in the direction of four second devices, wherein the antenna array is steered using the first beamforming weight matrices $w_{1,1}$, $w_{2,1}$, $w_{3,1}$, $w_{4,1}$ without sidelobe suppression. The first mobile station is located at an azimuth angle of −36 degrees with respect to the boresight axis of the antenna array. The second mobile station is located at an azimuth angle of −17 degrees with respect to the bore-sight axis of the antenna array. The third mobile station is located at an azimuth angle of 17 degrees with respect to the bore-sight axis of the antenna array. The fourth mobile station is located at an azimuth angle of 36 degrees with respect to the boresight axis of the antenna array.

Figure 13B:
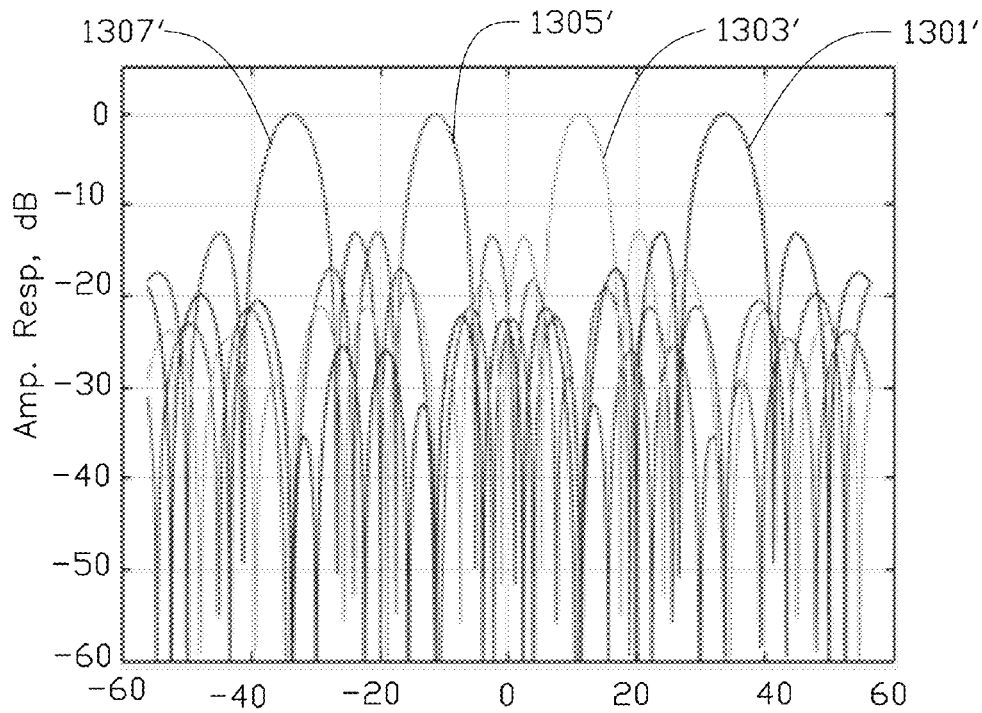

FIG. 13B illustrates beamforming radiation patterns 1301', 1303', 1305' and 1307' representing beams formed by the antenna array of the first device in the direction of the targeted mobile stations. The antenna array of the first device is steered to generate beams toward target second device while the sidelobes pointing at the positions of the adjacent second devices are suppressed to a very low level (e.g., at least −60 dB nulls) using the second beamforming weight matrices $w_{1,2}$, $w_{2,2}$, $w_{3,2}$, $w_{4,2}$, which are generated using the zero-forcing algorithm. The beamforming radiation pattern 1301' generated by the antenna array of the first device, has a peak gain at the azimuth angle of 36 degree and nulls at the azimuth angle of 17, −17, and −36 degrees, respectively. The beamforming radiation patterns 1303' generated by the antenna array of the first device, has a peak gain at azimuth angle of 17 degree and nulls at the azimuth angle of 36, −17, and −36 degrees. The beamforming radiation patterns 1305', generated by the antenna array of the first device, has a peak gain at the azimuth angle of −17 degree and nulls at the azimuth angle of 36, 17 and −36 degrees. The beamforming radiation patterns 1307', generated by the antenna.

An array of the first device, has a peak gain at the azimuth angle of −36 degree and nulls at the azimuth angles of 36, 17, and −17 degrees.

Additionally, the present disclosure also discloses a non-transitory computer-readable media for storing the computer executable program codes of the method for beamforming process depicted in FIGS. 3, 8, and 11. When the non-transitory computer readable recording medium is read by a processor, the processor executes the aforementioned method for beamforming process. The non-transitory computer-readable media may be a floppy disk, a hard disk, a compact disk (CD), a flash drive, a magnetic tape, accessible online storage database or any type of storage media having similar functionality known to those skilled in the art.

In summary, the present disclosure provides a method and a system for efficiently and accurately determining beamforming weights for antenna arrays, while the unknown amplitude errors and phase errors across the antenna array elements, are compensated automatically, at the same time. Thereby, enhancing signal transmission and reception accuracy and efficiency.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method, comprising:
receiving, by a first device having an antenna array, a first signal transmitted from a second device;
receiving, by the first device, a second signal transmitted from a third device adjacent to the second device;
generating, by the first device, a first beamforming weight matrix that corresponds to the second device using the first signal received, and generating another first beamforming weight matrix that corresponds to the third device using the second signal received;
generating, by the first device, a second beamforming weight matrix by applying a first window function, and generating another second beamforming weight matrix by applying a second window function, wherein the first window function is configured based on the separation between the second device and the third device, and the second window function is configured based on the separation between the third device and a fourth device adjacent to the second device and the separation between the second device and the third device; and
steering, by the first device, the antenna array according to the second beamforming weight matrix and the another second beamforming weight matrix to form a first beam and a second beam toward the second device and the third device, respectively.

2. The method according to claim 1, wherein the step of generating the second beamforming weight matrix comprises:
generating the first window function by generating a Chebyshev window, wherein the Chebyshev window is configured based on a channel condition between the first device and the second device; and
applying the first window function to the first beamforming weight matrix to generate the second beamforming weight matrix.

3. The method according to claim 1, wherein the step of generating the second beamforming weight matrix comprises:
generating the first window function by generating a finite impulse response filter, wherein the finite impulse response filter is configured based on a channel condition between the first device and the second device; and
applying the first window function to the first beamforming weight matrix to generate the second beamforming weight matrix.

4. The method according to claim 1, wherein the step of generating the first beamforming weight matrix comprises:
computing a covariance matrix based on the first signal; and
generating the first beamforming weight matrix by applying sub-space decomposition to the covariance matrix.

5. The method according to claim 1, wherein the step of generating the first beamforming weight matrix comprises:
computing a covariance matrix based on the first signal;
computing a noise variance of the first signal;
correcting the noise variance of a cross correlation vector in the covariance matrix by subtracting the noise variance from the cross correlation vector; and
generating the first beamforming weight matrix using the cross correlation vector.

6. A beamforming device for a MIMO system, comprising:
an antenna array configured to receive signals from a mobile device;
a processor coupled to the antenna array, wherein the processor is configured to:
cause the beamforming device having an antenna array, to receive a first signal transmitted from the mobile device and receive a second signal transmitted from a second mobile device adjacent to the mobile device;
generate a first beamforming weight matrix that corresponds to the mobile device using the first signal received and generate another first beamforming weight matrix that corresponds to the second mobile device using the second signal received;
generate a second beamforming weight matrix by applying a first window function and generate another second beamforming weight matrix by applying a second window function, wherein the first window function is configured based on the separation between the mobile device and the second mobile device, and the second window function is configured based on the separation between the second mobile device and a third mobile device adjacent to the mobile device and the separation between the mobile device and the second mobile device; and
cause the beamforming device, to steer the antenna array according to the second beamforming weight matrix and the another second beamforming weight matrix to form a beam and a second beam toward the mobile device and the second mobile device, respectively, for performing transmission and reception operation.

7. The beamforming device for the MIMO system according to claim 6, wherein the processor is configured to generate the first window function with a Chebyshev window, wherein the Chebyshev window is configured based on the channel condition between the first device and the second device.

8. The beamforming device for the MIMO system according to claim 6, wherein the processor computes a covariance matrix based on the first signal, and generates the first beamforming weight matrix by using sub-space decomposition to the covariance matrix.

9. The beamforming device for the MIMO system according to claim 6, wherein the processor computes a covariance matrix based on the first signal, a noise variance of the first signal, correcting the noise variance of a cross correlation vector in the covariance matrix by subtracting the noise variance from the cross correlation vector, and generating the first beamforming weight matrix using the cross correlation vector.

10. The beamforming device for the MIMO system according to claim 6, wherein the MIMO system is a time division duplex (TDD) MIMO system.

11. The beamforming device for the MIMO system according to claim 6 wherein the beamforming device is in a base station.

12. The beamforming device according to claim 6, wherein the beamforming device is in a remote radio head.

13. A method, the method comprising the steps of:
receiving, by a first device having an antenna array, a plurality of receiving signals transmitted from a plurality of second devices;
receiving, by the first device, a plurality of second signals transmitted from a plurality of third device adjacent to the second devices;
generating, by the first device, a plurality of first beamforming weight matrices and a plurality of another first beamforming weight matrices, wherein each first beamforming weight matrix corresponding to each respective second device using the respective receiving signals, and each another first beamforming weight matrix corresponding to each respective third device using the respective second signal received;
generating, by the first device, a second beamforming weight matrix according to the plurality of first beamforming weight matrices computed, and generating another second beamforming weight matrix according to the plurality of another first beamforming weight matrices computed; and
steering, by the first device, the antenna array according to the second beamforming weight matrix and the another second beamforming weight matrix to form a beam and a second beam toward the second devices and the third devices, respectively.

14. The method according to claim 13, wherein the step of generating second beamforming weight matrix comprises:
generating, by the first device, the second beamforming weight matrix by applying a zero-forcing operation to the plurality of first beamforming weight matrices.

15. The method according to claim 13, wherein the step of generating second beamforming weight matrix comprises:
generating, by the first device, the second beamforming weight matrix by applying a maximum ratio combining operation to the plurality of first beamforming weight matrices.

16. The method according to claim 13, wherein the step of receiving the plurality of receiving signals from the plurality of second devices comprises:
receiving, by the first device, the plurality of receiving signals from the plurality of second devices one at a time.

\* \* \* \* \*